3,387,917
METHOD OF REMOVING ACIDIC CONTAMINANTS FROM GASES

Wilhelm E. Walles and James J. Davies, Midland, Mich., assignors to The Dow Chemical Company, Midland, Mich., a corporation of Delaware
No Drawing. Filed Oct. 30, 1964, Ser. No. 407,891
12 Claims. (Cl. 23—2)

ABSTRACT OF THE DISCLOSURE

A new composition comprising an alkanolamine of 2–12 C atoms and a compound of the formula:

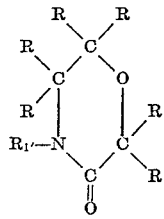

where R and $R_1'$ is a group of the formula $-(C_kC_{2k})H$ in which $k$ is an integer of from 0 to 5, and a method of extracting acidic gases from a gaseous feed stream by contacting the stream with the composition.

---

This invention relates to a method of removing acid gases from gaseous feed streams. More particularly, the present invention relates to a process for removing acid gases from a mixture containing such gases by contacting the mixture with an absorption medium containing a 3-morpholinone compound or substituted derivative thereof to absorb the acid gases.

The use of alkanolamines in combination with water for the absorption of acid gases is known. Furthermore, the use of mixtures of tetrahydrothiophene dioxide and diisopropanolamine for the extraction of acid gases is also known. Such a process is disclosed, for example, in U.S. Patent 3,039,251 to Kamlet. These systems have various disadvantages. The use of a monoethanolamine-water system for the removal of acid gases requires a condenser system in the deabsorption step because the water evaporates at the elevated temperatures used during deabsorption. Such prior art systems generally have one or more operational disadvantages such as undesirable viscosity relationships, excessive heat exchange requirements, high recycle rates, narrow absorption-temperature functions, poor selectivity and physical or chemical instability.

It has now been found that acid gases may be extracted from a gaseous feed stream by contacting the stream with a mixture containing a 3-morpholinone compound or an N-alkyl-3-morpholinone compound and an alkanolamine to form an acid gas-rich mixture, separating the acid gas-rich mixture from the gaseous feed stream and then regenerating the acid gases from the acid gas-rich mixture.

A class of the 3-morpholinone compounds which are used in the process of the invention may be represented by the formula

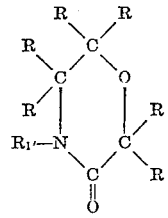

wherein each of $R_1'$ and R is a group of the formula $-(C_kH_{2k})H$ in which $k$ is an integer of from 0 to 5. Suitable R and $R_1'$ groups include the hydrogen atom, methyl, ethyl, n-propyl, i-propyl, n-butyl, i-butyl, sec.-butyl, tert.-butyl, n-pentyl and i-pentyl. N-methyl-3-morpholinone is a preferred component for use in the extraction media of the invention. Other preferred compounds include N-ethyl-2-methyl-3-morpholinone and N-butyl-4-ethyl-3-morpholinone.

The alkanolamine compound may contain from 2 to 12 carbon atoms. Suitable alkanolamines which may be used in the extraction media of the invention include alkanolamines of the formula

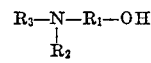

wherein $R_1$ is an alkylene group of from 2 to 4 carbon atoms (which may be represented by the formula $-(C_xH_{2x})-$ wherein $x$ is an integer of from 2 to 4) and each of $R_2$ and $R_3$ is independently selected from the group consisting of the hydrogen atom, the group $R_1OH$ (wherein $R_1$ is as previously defined) and an alkyl group of from 1 to 4 carbon atoms (such as a methyl, ethyl, n-propyl, i-propyl, n-butyl, i-butyl, sec.-butyl and tert.-butyl group). Examples of suitable alkanolamines include monoethanolamine (which is a preferred component of the extraction medium), diethanolamine, diisopropanolamine, triethanolamine, n-butanolamine and mixed alkanolamines such as

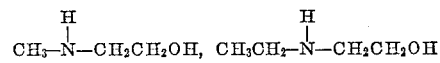

and

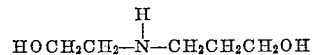

Since the properties of the alkanolamine and 3-morpholinone compound mixtures are different from those expected for mere physical solutions, it is believed that a loosely bound molecular complex is formed which has different absorbing properties than either component alone.

In a specific embodiment of the process of the invention, a gaseous feed stream containing at least one acid gas such as $H_2S$, $SO_2$, $CO_2$, COS or a mercaptan (SHR, wherein R is an alkyl group of up to 3 carbon atoms) is contacted with an extraction medium containing a 3-morpholinone compound and an alkanolamine in a weight ratio of from about 1:1 to 20:1, respectively, to form a "fat" medium which is rich in the acid gas. The fat material is then separated from the gaseous feed stream and at least a portion of the acid gas is removed (by either elevating the temperature or reducing the pressure, or by a combination of pressure and temperature variations). The deabsorbed extraction medium may then be recycled. The process can be run continuously or batchwise. The extraction medium will absorb water and the initial medium may contain up to about 15 percent by weight of water.

The absorption of the acid gases by the extraction medium suitably may be carried out under atmospheric pressure at temperatures of from about 15° to 60° C. over a time period of up to about one hour. Higher pressures increase the absorption rate at a given temperature and precise absorption conditions may be varied within wide limits. Similarly, the deabsorption step suitably may be carried out at temperatures of from about 85° to 160° C. under atmospheric pressure. Under these conditions, deabsorption is ordinarily substantially complete within about ten minutes with no mechanical agitation. The time required for deabsorption will depend upon the efficiency desired and the amount of agitation employed at a specific temperature and pressure. The range of temperatures employed during the absorption and deabsorption steps may overlap when the pressure is varied in each step.

Typical gaseous feed streams which may be treated according to the process of the invention include industrial gas streams (such as are obtained in oil refinery operations as well as flue gases), fuel gases, hydrogen gas streams contaminated with acid gases and sour natural gas streams. The extraction media used in the process of the invention will sweeten gas streams containing hydrogen and gaseous hydrocarbons (such as methane, ethane, acetylene, etc.). The amount of acid gas contained in the gaseous feed stream may vary up to 100 percent (i.e., gaseous streams composed entirely of acid gases may be contacted with the extraction medium and absorbed). Gas streams which contain at least one of the following indicated contaminants in the indicated amounts may be effectively treated according to the process of the invention: from 1 p.p.m. to 90 percent of $CO_2$; from 1 p.p.m. to 90 percent COS; from 1 p.p.m. to 90 percent $H_2S$; from 1 p.p.m. to 90 percent $SO_2$; and from 1 p.p.m. to 90 percent mercaptans of up to 3 carbon atoms (all percents by weight).

The following examples are submitted for the purpose of illustration only and are not to be construed as limiting the scope of the invention in any way.

Examples I–VI

Fifty grams of extraction medium (1:1 weight ratio of alkanolamine and N-methyl-3-morpholinone) was placed in a large test tube. A two-holed rubber stopper equipped with a glass bulb sparger and a glass vent line was fitted into the top of the tube and the entire assembly with its contents was weighed. Various acid gases ($H_2S$, $CO_2$ and COS) were separately sparged through the extraction medium for a period of 45 minutes at ambient temperature and pressure. The tubes (each containing "fat" extraction medium) were weighed to determine the amount of acid gas absorbed. The tubes were then placed in a preheated oil bath for 10 minutes at 85° C. and weighed. The tubes were again heated to 110° C. for another 10 minutes and weighed. This was repeated for still another 10 minute period at 135° C. prior to weighing. The results are summarized in Table 1. Solids did not form in any of the extraction media which were used. The extraction medium in each experiment remained fluid throughout the experiment. In order to obtain comparable results, no agitation was used in the regeneration step. Regeneration may be accomplished at lower temperatures (atmospheric pressure) by stirring the fat extraction medium.

3-morpholinone and monoethanolamine, the initial weight gain by the extraction medium was 3.64 grams. After heating for successive ten minute periods at atmospheric pressure (as in Examples I–VI) at temperatures of 85° C., 110° C., and 135° C., the amount of gas remaining in each extraction medium was 3.55, 3.40 and 1.75 grams, respectively. Solids did not precipitate from any of the extraction media which were used at any time.

We claim as our invention:

1. A process for the extraction of at least one acid gas selected from the group consisting of $H_2S$, $SO_2$, $CO_2$, COS or an alkyl mercaptan having up to 3 C atoms in the alkyl group from a gaseous feed stream which comprises contacting said gaseous feed stream with a mixture containing an alkanolamine of from 2–12 C atoms and a 3-morpholinone compound of the formula

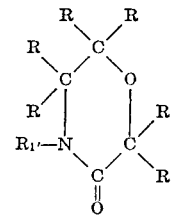

wherein each of R and $R_1'$ is a group of the formula $(C_kH_{2k})H$ in which $k$ is an integer of from 0 to 5, to form an acid gas-rich mixture and separating said acid gas-rich mixture from the gaseous feed stream.

2. The process of claim 1 wherein the 3-morpholinone compound is N-methyl-3-morpholinone.

3. The process of claim 2 wherein the alkanolamine is monoethanolamine.

4. The process of claim 2 wherein the alkanolamine is diisopropanolamine.

5. A process for the extraction of at least one acid gas selected from the group consisting of $H_2S$, $SO_2$, $CO_2$, COS, or an alkyl mercaptan having up to 3 C atoms in the alkyl group from a gaseous feed stream which comprises contacting said gaseous feed stream with an extraction medium containing (a) a 3-morpholinone compound of the formula

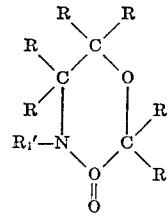

TABLE 1

| Example Number | Acid Gas | Amount (Grams) of Acid Gas Absorbed by 50 Grams Extraction Medium in 45 Minutes at Ambient Temperature and Pressure | Composition of Extraction Medium 1:1 (Weight) | Grams of Acid Gas Remaining in Extraction Medium After 10 Minutes at the Indicated Temperatures Without Agitation | | |
|---|---|---|---|---|---|---|
| | | | | 85° C. | 110° C. | 135° C. |
| I | $CO_2$ | 9.2 | N-methyl-3-morpholinone:monoethanolamine | 9.2 | 7.9 | 4.7 |
| II | $CO_2$ | 4.1 | N-methyl-3-morpholinone:diisopropanolamine | 3.4 | 1.1 | 0.3 |
| III | $H_2S$ | 11.2 | N-methyl-3-morpholinone:monoethanolamine | 10.5 | 6.8 | 2.4 |
| IV | $H_2S$ | 5.0 | N-methyl-3-morpholinone:diisopropanolamine | 1.3 | 1.2 | 0.8 |
| V | COS | 11.6 | N-methyl-3-morpholinone:monoethanolamine | 11.5 | 9.5 | 6.8 |
| VI | COS | 5.4 | N-methyl-3-morpholinone:diisopropanolamine | 5.3 | 4.5 | 2.9 |

Example VII

A natural gas sample (predominantly methane) containing about 6 percent (weight) of $H_2S$ and up to about 4.5 percent (weight) of mercaptans was treated in a manner similar to the method of Examples I–VI. The flow rate of the sour gas through the extraction medium was about 11.3 times greater than the rate employed in Examples I–VI in order to increase the amount of $H_2S$ available for absorption in the 45 minute period. Using a 50 gram sample of a 1:1 weight mixture of N-methylwherein each of R and $R_1'$ is a group of the formula $(C_kH_{2k})H$ in which $k$ is an integer of from 0 to 5, (b) an alkanolamine of the formula $$R_3-N-R_1-OH$$
$$\quad\;\;|$$
$$\quad\;\;R_2$$

wherein $R_1$ is an alkylene group of from 2 to 4 carbon atoms and each of $R_2$ and $R_3$ is independently selected from the group consisting of the hydrogen atom, a lower alkyl group and the group $R_1OH$ wherein $R_1$ is as previously defined, to absorb acid gas and form an acid gas-rich mixture, removing said acid gas-rich mixture from the gaseous feed stream and regenerating at least a portion of the absorbed acid gas from said acid gas-rich mixture.

6. The process of claim 5 wherein the 3-morpholinone compound is N-methyl-3-morpholinone and wherein the alkanolamine is monoethanolamine.

7. The process of claim 5 wherein the 3-morpholinone compound is N-methyl-3-morpholinone and wherein the alkanolamine is diisopropanolamine.

8. A process for the extraction of an acid gas from a gaseous feed stream containing at least one acid gas from the group consisting of $H_2S$, $CO_2$, COS and $SO_2$ which comprises contacting said gaseous feed stream with a mixture containing N-methyl-3-morpholinone and an alkanolamine of no more than 12 carbon atoms in a weight ratio of from 1:1 to 20:1, respectively, to absorb said gas and form an acid gas-rich mixture, separating said acid gas-rich mixture from the gaseous feed stream and regenerating acid gas from the acid gas-rich mixture.

9. The process of claim 8 wherein the acid gas is absorbed at a temperature of from 15° to 60° C. under atmospheric pressure and wherein absorbed acid gas is regenerated at a temperature of from 85° to 160° C. under atmospheric pressure.

10. The process of claim 9 wherein the alkanolamine is monoethanolamine.

11. The process of claim 9 wherein the alkanolamine is diisopropanolamine.

12. A mixture suitable for the extraction of acid gases which comprises an alkanolamine of from 2 to 12 carbon atoms and a compound of the formula

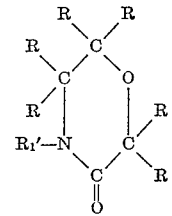

wherein each of R and $R_1'$ is a group of the formula $(C_kH_{2k})H$ in which each k is an integer of from 0 to 5, in a weight ratio of said morpholinone to said alkanolamine of from about 1:1 to 20:1, respectively.

References Cited

UNITED STATES PATENTS 3,120,487   2/1964   Norton et al.
3,161,461   12/1964  Deal et al. _____ 23—2 X

FOREIGN PATENTS 420,506   1/1935   Great Britain.

EARL C. THOMAS, Primary Examiner.